United States Patent [19]
Song

[11] Patent Number: 5,893,930
[45] Date of Patent: Apr. 13, 1999

[54] PREDICTIVE TRANSLATION OF A DATA ADDRESS UTILIZING SETS OF ASSOCIATIVE ENTRIES STORED CONSECUTIVELY IN A TRANSLATION LOOKASIDE BUFFER

[75] Inventor: Seungyoon Peter Song, Los Altos, Calif.

[73] Assignee: International Business Machines Corporation, Armonk, N.Y.

[21] Appl. No.: 08/678,940

[22] Filed: Jul. 12, 1996

[51] Int. Cl.$^6$ .................................................. G06F 12/10
[52] U.S. Cl. .................................................. 711/205
[58] Field of Search ............................. 711/128, 204, 711/205, 207

[56] References Cited

U.S. PATENT DOCUMENTS

| | | | |
|---|---|---|---|
| 4,727,484 | 2/1988 | Saito | 711/3 |
| 4,849,876 | 7/1989 | Ozawa et al. | 711/207 |
| 4,980,816 | 12/1990 | Fukuzawa et al. | 711/207 |
| 5,129,068 | 7/1992 | Watanabe et al. | 711/214 |
| 5,136,696 | 8/1992 | Beckwith et al. | 395/587 |
| 5,148,528 | 9/1992 | Fite et al. | 395/386 |
| 5,148,530 | 9/1992 | Joyce et al. | 711/225 |
| 5,148,538 | 9/1992 | Celtruda et al. | 711/205 |
| 5,168,571 | 12/1992 | Hoover et al. | 395/386 |
| 5,179,674 | 1/1993 | Williams et al. | 711/204 |
| 5,226,130 | 7/1993 | Favor et al. | 395/585 |
| 5,251,306 | 10/1993 | Tran | 395/393 |
| 5,278,963 | 1/1994 | Hattersley et al. | 711/204 |
| 5,335,333 | 8/1994 | Hinton et al. | 711/207 |
| 5,367,656 | 11/1994 | Ryan | 711/213 |
| 5,377,336 | 12/1994 | Eickemeyer et al. | 395/383 |
| 5,390,307 | 2/1995 | Yoshida | 395/566 |
| 5,392,410 | 2/1995 | Liu | 711/3 |
| 5,394,529 | 2/1995 | Brown, III et al. | 395/587 |
| 5,404,467 | 4/1995 | Saba et al. | 395/383 |
| 5,418,922 | 5/1995 | Liu | 711/3 |

FOREIGN PATENT DOCUMENTS

0588252A2  3/1994  European Pat. Off. .

OTHER PUBLICATIONS

IBM Technical Disclosure Bulletin, Mechanism for Checking Parity and Error Checking and Correction Functions in Processing and Processor-Linked Subsystems, May 1979, vol. 21 No. 12, pp. 4871-4877.

IBM Technical Disclosure Bulletin, High-Speed Real-Time Event Processor, Jul. 1987, vol. 30 No. 2, pp. 632-634.

IBM Technical Disclosure Bulletin, Look-up for Logical Address-Based Cache Directory, Oct. 1991, vol. 34 No. 5, pp. 204-207.

(List continued on next page.)

*Primary Examiner*—Jack A. Lane
*Attorney, Agent, or Firm*—Sawyer & Associates; Casimer K. Salys

[57] ABSTRACT

A method for performing predictive translation of a data address in a computer processing system includes organizing a translation lookaside buffer in a set associative manner having each set associated with multiple entries, wherein the multiple entries store consecutively ordered selections. Further, the method includes selecting a set of entries in the translation lookaside buffer in response to a base operand for the predictive translation. The method also includes comparing each entry in the selected set with an input address for determining whether or not the predictive translation failed. The method further includes the step of adding the base operand with an offset operand to produce the effective address. A system in accordance with the present invention includes effective address generation logic, including a base operand register to hold a base operand, and a translation lookaside buffer, translation lookaside buffer. The translation lookaside buffer includes a multiple number of entries organized in a set associative manner to map a desired number of consecutive pages into a single set, and coupled to the effective address generation logic to utilize selected bits of the base operand for selection of a set of entries and for comparing each entry in the selected set with an input address for determining whether or not the predictive translation failed.

20 Claims, 5 Drawing Sheets

OTHER PUBLICATIONS

IBM Technical Disclosure Bulletin, C–Segment Handling with Randomization of DLAT Entry Selection with STOs, Aug. 1990, vol. 33, No. 3B, pp. 61–62.

IBM Technical Disclosure Bulletin, Logical Directory for Real Address–Based Cache, Jun. 1993, vol. 36, No. 06B, pp. 313–318.

Ogden, Deene, Kuttanna, Belli, Loper, Albert J., Mallick, Soummya, and Putrino, Michael, IBM Corporation & MotorolaInc., Somerset Design Center, A PowerPC Microprocessor for the Portable Market, Jan. 1995,pp. 1–4.

Levitan, D.; Thomas, T.; and Tu, P.; The PowerPC 620 Microprocessor: A High performance Superscalar RISC Microprocessor, Motrola & IBM, Somerset Dsign Center, 8 pages.

Allen, M.; and Lewchuck, W.; A Pipelined, Weakly–Ordered Bus for Multi–Processing Systems, Somerset Design Center, Motorola Inc., IBM, pp. 1–8.

Yuan, J.; Taborn, M.; Lee, D.; and Tsay, A.; PowerPC 620 in Distributed Computing, Somerset Design Center, Motorola Inc., IBM, 7 pages.

Braithwaite, Using The PowerPC Microprocessor for Power–managed Systems, IBM Microelectronics Division, pp. 1–11.

Peng, C.; Peterson, T.; and Clark,R.; The PowerPC Architecture: 64–bit Power with 32–bit Compatibility, Motorola Inc.,IBM Corporation, 1–9.

PREDICTIVE TRANSLATION OF A DATA ADDRESS UTILIZING SETS OF ASSOCIATIVE ENTRIES STORED CONSECUTIVELY IN A TRANSLATION LOOKASIDE BUFFER

TECHNICAL FIELD

This patent application relates to data address translation in computer processors, and more particularly to predictive data address translation in computer processors.

BACKGROUND

In the continuing development of faster and more powerful computer systems, microprocessors have been utilized, known as complex instruction set computer (CISC) processors and reduced instruction set computers (RISCs). Increased advances in the field of RISC and CISC processors have led to the development of superscalar processors. Superscalar processors, as their name implies, perform functions not commonly found in traditional scalar microprocessors. Included in these functions is the ability to execute instructions out-of-order with respect to the program order. Although the instructions occur out-of-order, the results of the executions appear to have occurred in program order, so that proper data coherency is maintained.

Although the background will be discussed in the context of a superscalar design, many of these features can apply to other high speed processing systems.

In performing instructions, data address generation typically occurs as shown by the block diagram of FIG. 1a. A base value 8 in a base register, for example, register A, is added to an offset value 9, where the offset value 9 is immediate data or a value stored in a register B, to produce an effective address, EA. The base value 8 in register A normally points to some location in a page of memory with the offset value 9 adding a particular adjustment to that location. The EA is then translated via a translation mechanism 11 to produce the physical address, PA. The PA is then used to locate the data in main memory or a data cache 16. A main goal of producing faster system operations is to reduce the time required to generate the PA.

Typically, the translation mechanism controls the speed of the address translation and is a table lookup mechanism, commonly referred to as a translation lookaside buffer, TLB, that maps the EA to PA. Three basic organizations are usually used in a TLB and are known as direct mapping, 'n'-way set associative mapping, and fully associative mapping.

FIGS. 1b–d are conceptual illustrations of exemplary mapping techniques for caching information, according to the prior art. A cache directory 10 has $p=2^K=8$ entries, each associated with a respective block of information within a cache memory. A matrix 12 has $q=2^{m+k}=64$ octal addresses, each representing a respective block of information within a secondary memory. FIGS. 1b–d show each block of matrix 12 together with the block's respectively associated address. Each of the q octal addresses of matrix 12 has m+k=6 address bits.

FIG. 1b illustrates a direct mapping technique. In FIG. 1b, matrix 12 and directory 10 are logically arranged into $p=2^k=8$ congruence classes. A congruence class is specified by an address's low-order k address bits. Accordingly, each congruence class includes multiple addresses, all of which share the same low-order k address bits. For FIG. 1b, k=3 and m=3.

For example, in FIG. 1b, one congruence class includes 10 all addresses whose low-order three address bits are octal 7. This congruence class includes the octal addresses 07, 17, 27, 37, 47, 57, 67 and 77. Likewise, another congruence class includes the octal addresses 02, 12, 22, 32, 42, 52, 62 and 72.

In FIG. 1b, each congruence class has one respective preassigned associated entry within cache directory 10. Accordingly, at any single moment, the cache memory stores information for only a single address of a congruence class; this single address is specified in the congruence class's associated entry of cache directory 10. For example, in the congruence class's associated entry, cache directory 10 can store a tag including the single address's high-order m address bits. For FIG. 1b, m=3.

As an example, in FIG. 1b, from among the eight addresses whose low order three address bits are octal 5, cache directory 10 indicates that the cache memory stores information for only octal address 45 whose tag value is octal 4. Similarly from among the eight addresses whose low order three address bits are octal 1, cache directory 10 indicates that the cache memory stores information for only octal address 31.

Accordingly, the low-order k address bits of an address ADDR specify the congruence class of ADDR. Moreover, the low-order k address bits operate as an index to access the congruence class's associated entry within cache directory 10 and its associated block of information within the cache memory by binary decoding. The indexed entry of cache directory 10 is read and compared with ADDR. If ADDR matches the indexed entry, then the indexed block of the cache memory stores information for ADDR.

A disadvantage of the direct mapping technique is that storage in the cache memory of one address's information excludes the storage of information for all other addresses of the same congruence class. This disadvantage is augmented by the fact that the number ($2^k$) of entries in cache directory 10, so that a large number of addresses are forced to share a single entry in cache directory 10. Likewise, all addresses of a single congruence class are forced to share a single entry in the cache memory.

FIG. 1c illustrates an n-way set-associative mapping technique, where n=2. In FIG. 1c, matrix 12 and directory 10 are logically arranged into p/n=4 congruence classes. A congruence class is specified by an address's low-order y address bits, where $p/n=w^y$. Accordingly, each congruence class includes multiple addresses, all of which share the same low-order y address bits. For FIG. 1c, k=3 and y=2.

For example, in FIG. 1c, one congruence class includes all addresses whose low-order two address bits have a value=3. This congruence class includes the octal addresses 03, 07, 13, 17, 23, 27, 33, 37, 43, 47, 53, 37, 63, 67, 73 and 77. Likewise, another congruence class includes the octal addresses 01, 05, 11, 15, 21, 25, 31, 35, 41, 45, 51, 55, 61, 65, 71 and 75.

In FIG. 1c, cache directory 10 is logically arranged into two columns having four blocks each. Thus, each congruence class has a respective preassigned associated set of first and second entries within cache directory 10. Accordingly, at any single moment, the cache memory stores information for first and second addresses of a congruence class; the first and second addresses are specified in the congruence class's associated set of first and second entries within cache directory 10. For example, in the first associated entry, cache directory 10 can store a first tag including the first address's high-order m+1 address bits; in the second associated entry, cache directory 10 can store a second tag including the second address's high-order m+1 address bits. For FIG. 1c, m=3.

As an example, in FIG. 1c, from among the sixteen addresses whose low order two address bits have a value=1, cache directory 10 indicates that the cache memory stores information for only octal address 05 and octal address 11. Similarly, from among the sixteen addresses whose low order two address bits have a value=3, cache directory 10 indicates that the cache memory stores information for only octal address 43 and octal address 13.

Accordingly, the low-order y address bits of address ADDR specify the congruence class of ADDR. Moreover, the low-order y address bits operate as an index to the congruence class's associated set of two entries within cache directory 10 and its associated set of two blocks within the cache memory. The two indexed entries of cache directory 10 are read and compared with ADDR. If ADDR matches one of the indexed entries, then the matching entry's associated block of the cache memory stores information for ADDR. A disadvantage of the set-associative technique is delayed selection of information output from the cache memory, resulting from selection between the two indexed entries of cache directory 10.

FIG. 1d illustrates a fully associative mapping technique. In FIG. 1d, matrix 12 and directory 10 are not logically arranged into congruence classes. Accordingly, at any single moment, the cache memory can store information for any group of eight addresses; these eight addresses are specified in the eight entries of cache directory 10. For example, cache directory 10 can store eight tags, each including all bits of an address.

In FIG. 1d, cache directory 10 is structured as a content addressable memory ("CAM") array of p=8 CAM entries by m+k=6 address bits. As a CAM array, cache directory 10 inputs address ADDR and compares it simultaneously with all addresses in the eight CAM entries. If ADDR matches any CAM entry's address, then a respective one of match lines 14a–h is asserted to directly select the cache memory block storing information for ADDR. Thus, cache directory 10 operates as a decoder and accessing mechanism for the cache memory.

A disadvantage of the fully associative technique is the expense, complexity, and diminished speed of a CAM array having m+k address bit lines by p match lines This is especially true as the number (m+k) of address bits increases in conjunction with the number ($q=2^{m+k}$) of secondary memory blocks.

Although the attempts to use set associative methods to improve translation are generally satisfactory, improvements for reducing translation time and increasing performance are desirable. Accordingly, a need exists for a system of producing better translation mechanisms, including predictive data address translation to improve overall processor performance.

SUMMARY

Accordingly, the needs are met and a method and system is provided for performing predictive data address translation in a computer processing system. In a method aspect, the method includes organizing a translation lookaside buffer, TLB, in a set associative manner having each set associated with multiple entries, wherein the multiple entries store consecutively ordered selections. Further, the method includes selecting a set of entries in the TLB in response to the bass operand, and comparing each entry in the selected set with an input address. The method also includes detecting a translation prediction failure and adding the base operand with an offset operand to produce an effective address. In addition, when the comparing step results in a match, the entry producing the match is used to produce a real address.

In a system aspect, the system includes effective address generation logic, including a base operand register to hold a base operand, and a translation lookaside buffer, TLB. The TLB includes a multiple number of entries organized in a set associative manner to map a desired number of consecutive pages into a single set, and coupled to the effective address generation logic to utilize selected bits of the base operand for selection of a set of entries.

Further, the effective address generation logic further includes an offset operand register to hold an offset operand and an adder, wherein the offset operand register and base operand register are coupled to the adder such that the adder combines the offset operand and base operand to produce an effective address. The system further includes one or more comparators for comparing chosen bits of the entries of the selected set with the effective address. Additionally, a multiplexor is coupled to the at least one comparator for outputting a real address when there is a match between the effective address and one of the entries of the selected set. A translation prediction fail detection mechanism coupled to receive the offset operand and the effective address, detects a translation prediction failure.

An n-way set associative mapping is effectively utilized to produce a system that has improved translation prediction. The improvement is achieved with the efficient use of consecutive page mapping in each set of the TLB and basing the selection of a set on a portion of a base value operand. Also, a translation prediction failure mechanism allows prediction failure recovery to occur in a next cycle, thus further enhancing the efficiency and performance of the system. These and other advantages of the aspects of the illustrative embodiment will be more fully understood in conjunction with the following detailed description and accompanying drawings.

DETAILED DESCRIPTION

The illustrative embodiment relates to data address translation mechanisms in a computer processor. The following description is presented to enable one of ordinary skill in the art to make and use the illustrative embodiment and is provided in the context of a patent application and its requirements. Various modifications to the preferred embodiment and the generic principles and features described herein will be readily apparent to those skilled in the art.

Figure 1A:
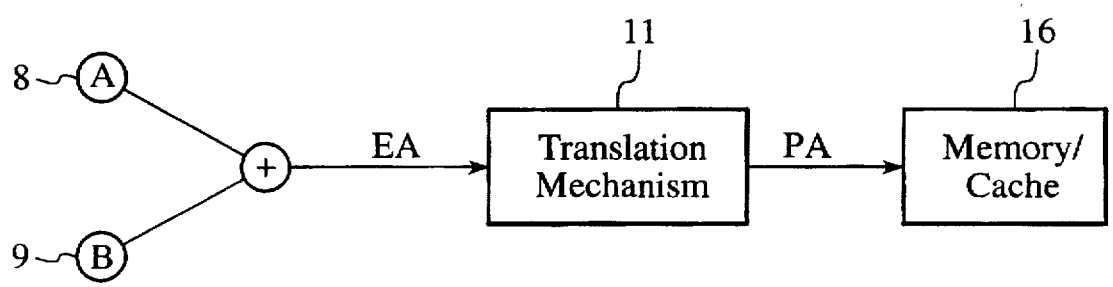
FIG. 1a illustrates a block diagram of a typical effective address generation and translation system.
Figure 2:
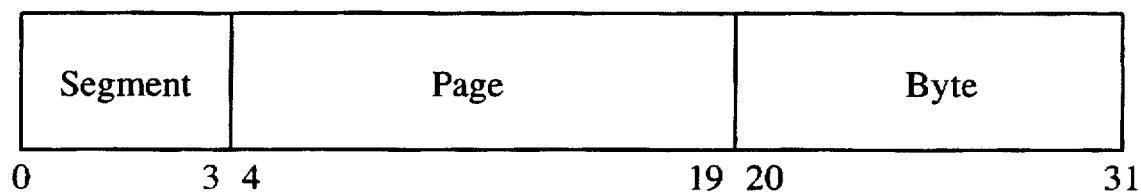
FIG. 2 illustrates a typical format for a thirty-two bit effective address.

In a computer processor, such as the 32-bit PowerPC processor from IBM Corporation, Armonk, N.Y., employing both virtual and real address spaces, an EA normally maps the virtual address space to the real address space. A typical format for the EA takes a form as shown in FIG. 2. The four most significant bits (MSBs) identify a segment register, the next 16 bits identify a page address, and the last 12 bits identify a byte within the page. A virtual address may then be generated using the EA by techniques including segment tables that are well understood by those skilled in the art. The real or physical address is then normally translated via a translation mechanism, commonly referred to as a TLB.

As discussed previously, when accessing data during processing, such as when generating the effective addresses of the operands "A" and "B" from the "load A,B" instruction, data translation occurs to change the EA into the real or PA, via a TLB. In accordance with the illustrative embodiment, set associative mapping is used to improve translation by employing translation prediction. Further, the practicality of employing prediction is enhanced due to the page size being usually quite large in comparison to the offset value. By way of example, an offset value might be a byte change to an address that addresses a 4 Kbyte page. Thus, a TLB in accordance with the illustrative embodiment is organized such that a chosen number of consecutive pages are mapped into a single set.

Figure 3:
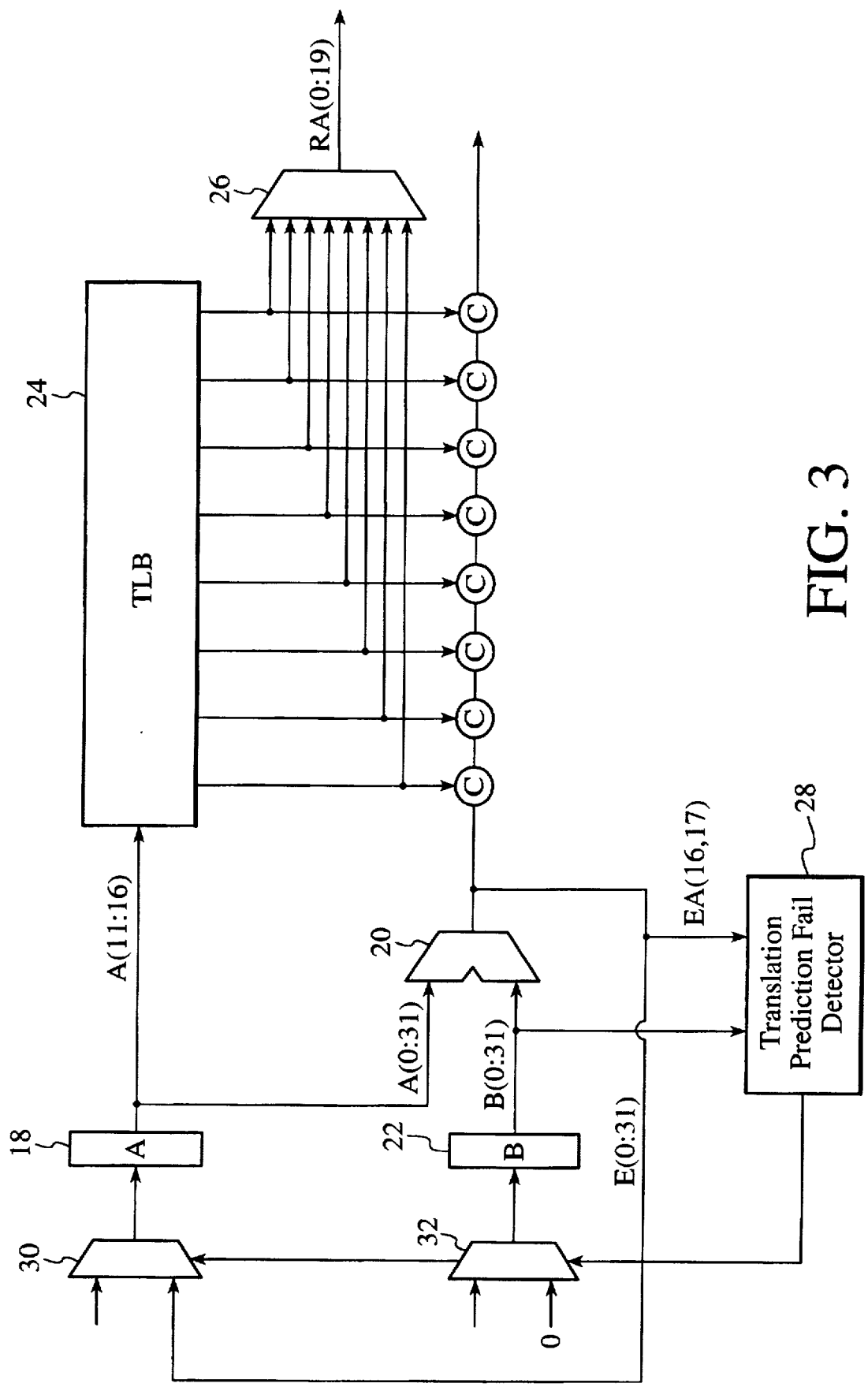
FIG. 3 illustrates a predictive data address translation mechanism in accordance with the illustrative embodiment.

For purposes of illustration, an eight way set associative organization is described in conjunction with the block diagram of FIG. 3. However, other desirable designs are possible, such as a sixteen way set associative mapping, in which the indexing and comparison schemes would use different address bits as is well appreciated by those skilled in the art. Further, the following is described with reference for use with a 32-bit processor and should be considered illustrative and not restrictive of the illustrative embodiment.

Figure 1B:
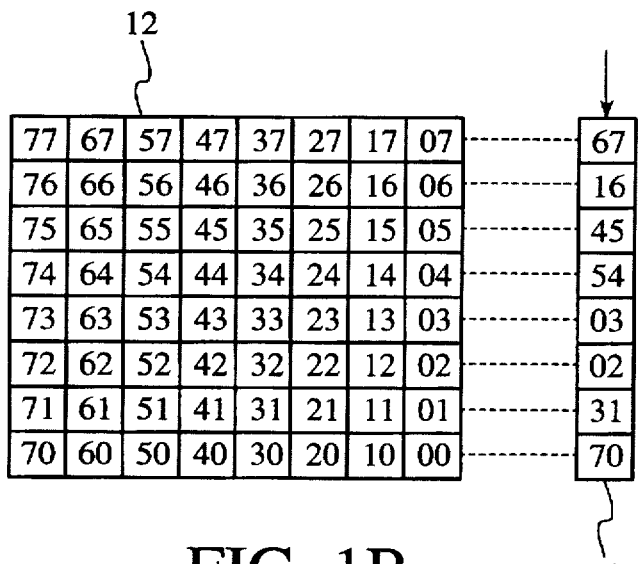
FIG. 1b–1d are conceptual illustrations of exemplary mapping techniques for caching information according to the prior art.
Figure 1C:
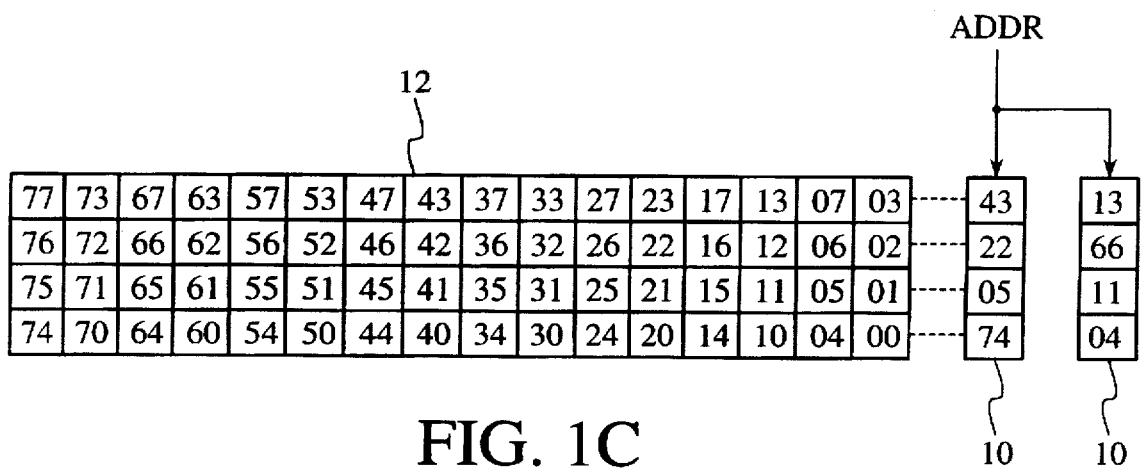
Figure 1D:
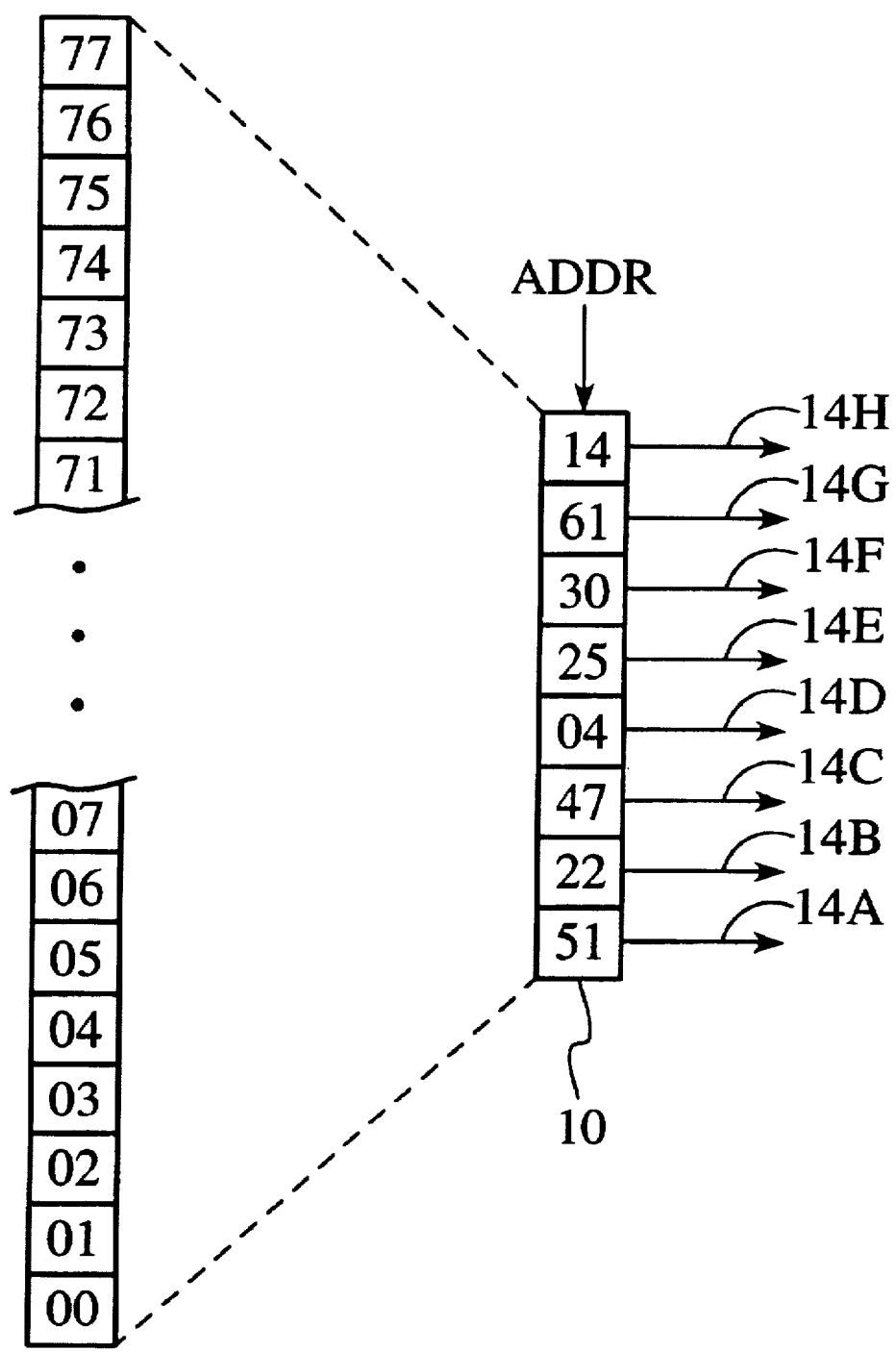
Figure 1E:
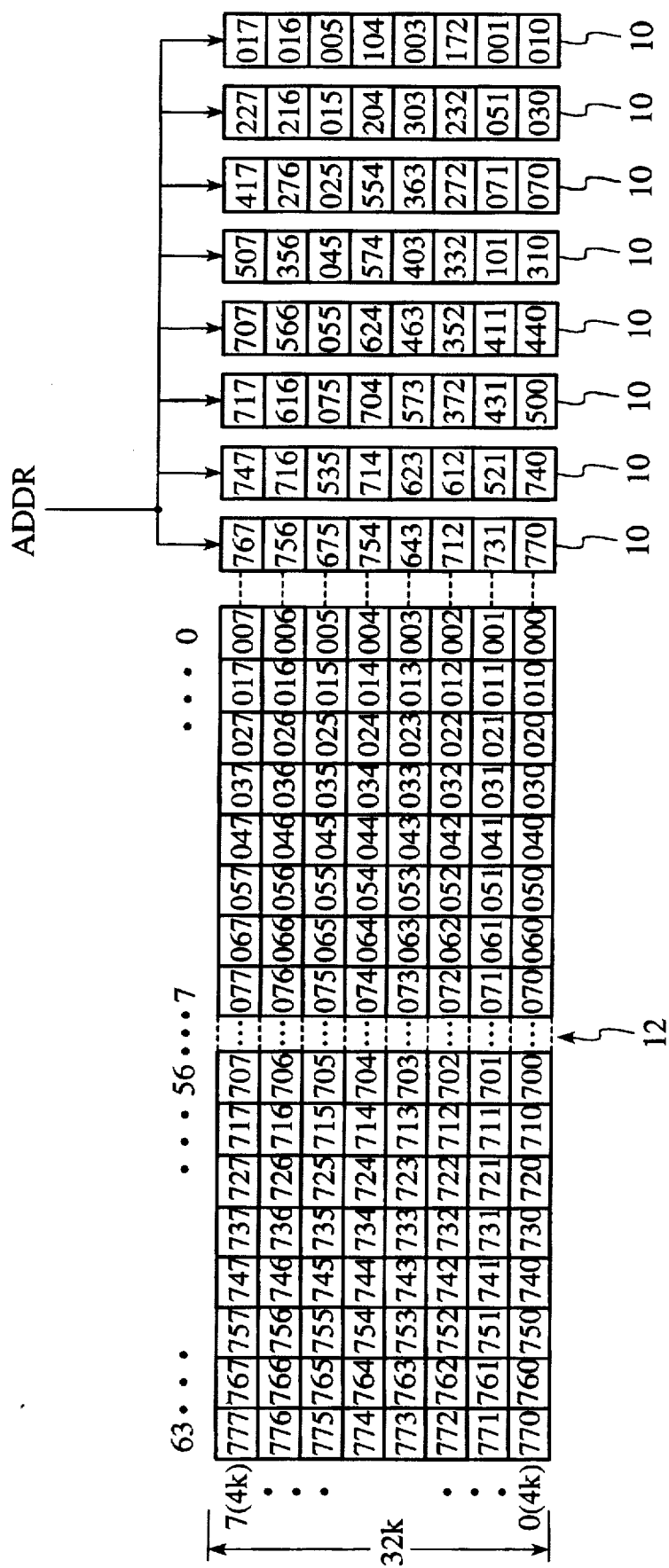
FIG. 1e illustrates a mapping technique in accordance with the present invention.

Referring to FIGS. 3 and 1e, a 32 bit base operand, 'A', is transferred from a register offset added via an adder 20 to an offset operand 'B' from a second register 22. The sum of the two operands results in an EA. While the addition of two operands to produce an EA is similar to other techniques, in a same cycle as the addition step, the illustrative embodiment produces a predictive translation by using a chosen number of bits of the base operand as a selection mechanism in a TLB 24. TLB 24 is suitably a table of sufficient size to accommodate a desired number of mappings.

By way of example, for an eight-way set associative TLB organization having 64 sets with eight entries per set, bits 11 to 16 of the base operand 'A' suitably select one of the 64 sets of the TLB 24. In accordance with the illustrative embodiment, and as illustrated in FIG. 1E, the eight entries map corresponds to eight consecutive pages, each page having a 4 Kbyte boundary. Thus, a first set in matrix 12 and 8 columns having 8 blocks each in directory 10, set 0, suitably would have entries mapping pages 0–7, 512–519, 1024–1031, etc. In a traditional set associative approach with 64 sets bits 14:19 would be utilized to map, for example, pages 0, 64, 128, 192, etc. into set 0.

With the selection of one of the 64 sets by the selected six bits of a 'page' portion of the 32 bits of the 'A' operand, entries for eight consecutive 4 Kbyte pages are produced, each entry comprising 20 bits. Selected bits of each of the eight entries are preferably compared with selected bits of the effective address, e.g., bits 0:10 and 17:19, to determine whether the predictive translation produces a match. In a traditional set-associative approach, bits 0–13 would be utilized for matching.

The comparisons are suitably performed using well-known multi-bit comparator logic devices with the comparison step represented by the encircled 'C's in the diagram. When one of the comparisons results in a match, the predictive data translation was successful.

Of course, the predictive translation mechanism operates successfully when the base operand and offset are within a predetermined page boundary range. With the example of the eight-way set associative mechanism, when the EA crosses a 32 Kbyte page boundary, i e., when the EA and the base address are in two different 32K byte blocks, a translation prediction failure occurs. In traditional set associative mapping, failure occurs when the EA and the base address are in two different 4K byte blocks. Translation prediction failures in this example are thus suitably indicated when the 17 most significant bits (MSBs) of the base operand, i.e., A(0:16), differ from the 17 MSBs of the EA, i.e., EA(0:16).

In order to determine when the translation mechanism has failed, a translation prediction fail detector mechanism 28 is preferably included. Such determinations are suitably performed by techniques well known in the art by detecting when there has not been successful translation prediction, where successful translation prediction is indicated by all 0's in the 17 MSBs of the offset operand, i.e., B(0:16), and a lack of a carry from EA(17) into EA(16), or by all 1's in B(0:16) with the presence of a carry bit from EA(17) into EA(16). When the prediction translation has failed, the translation prediction fail detection mechanism 28 suitably performs the necessary checks and outputs selection signals into multiplexors 30 and 32, such that in a next cycle, the calculated EA is selected from multiplexor 30, while a '0' input is selected from multiplexor 32. Thus, in the next cycle, the correct translation occurs with the use of the EA that was calculated during the predicted translation of the previous cycle. However, when prediction has not failed, the real address of the desired page has been successfully located in the TLB and is preferably output from a multiplexor 26 as real address (RA) bits 0:19. Suitably, the twenty RA bits are concatenated with the lower twelve bits of the EA, which normally are unchanged during translation, to form a 32-bit RA as is well known to those skilled in the art.

Thus, the illustrative embodiment advantageously uses an efficient prediction translation mechanism to reduce data address translation time by not requiring calculation of the EA before the accessing of the TLB. Through this system there is an increased probability of a match, even if the base address an effective address fall on nearly adjacent pages because a set of consecutively ordered pages has been selected. Hence, if the base address falls within the appropriate set of pages a match could still occur. Further, when the prediction is wrong, the correct translation directly occurs in the next cycle, since the EA is calculated in the same cycle as the predicted translation.

Although the illustrative embodiment has been described in accordance with the embodiments shown, one of ordinary skill in the art will recognize that there could be variations to the embodiment and those variations would be within the spirit and scope of the illustrative embodiment. For example, although the illustrative embodiment has been described with reference to a 32-bit superscalar processor, the techniques of the illustrative embodiment are also suitable for use in other types of RISC and CISC processors. Accordingly, many modifications may be made by one of ordinary skill without departing from the spirit and scope of the illustrative embodiment, the scope of which is defined by the following claims.

What is claimed is:

1. A method for performing predictive translation of a data address in a computer processing system, the method comprising:

organizing a translation lookaside buffer in a set associative manner having each set associated with multiple entries, wherein the multiple entries store consecutively ordered selections;

selecting a set of entries in the translation lookaside buffer in response to a base operand for the predictive translation; and comparing each entry in the selected set with an input address for determining whether or not the predictive translation has failed.

2. The method of claim 1 wherein if the comparing results in a match, the entry producing the match is used to produce a real address.

3. The method of claim 1 wherein the method further comprises the step of adding the base operand with an offset operand to produce an effective address.

4. The method of claim 3 further comprising detecting a translation prediction failure.

5. The method of claim 4 wherein the step of detecting the translation prediction failure further comprises determining whether there is not a selected number of bits in the offset operand of a same value without a carry value in the input address.

6. The method of claim 5 wherein the same value is all 0 logical states.

7. The method of claim 4 wherein the step of detecting the translation prediction failure further comprises determining whether there is not a selected number of bits in the offset operand of a same value with a carry value in the input address.

8. The method of claim 7 wherein the same value is all 1 logical states.

9. The method of claim 4 wherein when a translation prediction failure is detected, the method further comprises selecting a matching entry in the translation lookaside buffer in response to the input address.

10. The method of claim 1 wherein each set is associated with eight entries and the consecutively ordered selections comprise eight consecutive pages.

11. The method of claim 1, wherein the predictive translation fails when a base and an offset of the data address cross a 32 Kbytes block boundary.

12. A predictive data address translation system for a computer processing system, the system comprising:

effective address generation logic, including a base operand register for holding a base operand; and a translation lookaside buffer, the translation lookaside buffer comprising a multiple number of entries organized in a set associative manner to map a desired number of consecutive pages into a single set, and coupled to the effective address generation logic to utilize selected bits of the base operand for selection of a set of entries and for determining whether or not a predictive translation of a data address has failed.

13. The system of claim 12 wherein the effective address generation logic further comprises an offset operand register to hold an offset operand and an adder, wherein the offset operand register and base operand register are coupled to the adder such that the adder combines the offset operand and base operand to produce an effective address.

14. The system of claim 13 wherein the system further comprises one or more comparators for comparing chosen bits of the entries of the selected set with the effective address.

15. The system of claim 14 wherein the system further comprises a multiplexor coupled to the at least one comparator for outputting a real address when there is a match between the effective address and one of the entries of the selected set.

16. The system of claim 13 wherein the system further comprises a translation prediction fail detection mechanism coupled to receive the offset operand and the effective address, the mechanism detecting a translation prediction failure.

17. The system of claim 16 wherein the translation prediction fail detection mechanism detects prediction failure when a selected number of bits of the offset operand are all 1's and there is a carry value in the effective address.

18. The system of claim 16 wherein the translation prediction fail detection mechanism detects the translation prediction success when a selected number of bits of the offset operand are all 0's and there is no carry value in the effective address.

19. A method of organizing a translation lookaside buffer to improve prediction accuracy of data address translation by allowing predictive translation, the method comprising:

forming a translation lookaside buffer including a plurality of sets, each set including 'n' entries;

associating 'n' consecutive pages of memory with the 'n' entries of a set in the translation lookaside buffer; and comparing each of the 'n' entries in a selected set with an input address.

20. The method of claim 19 wherein the step of associating further comprises associating eight consecutive pages into each set.

* * * * *